United States Patent
Gumerato et al.

(10) Patent No.: US 10,911,536 B2
(45) Date of Patent: Feb. 2, 2021

(54) REAL-TIME SYNCHRONIZATION OF DATA BETWEEN DISPARATE CLOUD DATA SOURCES

(71) Applicant: TalkCycle LLC, San Mateo, CA (US)

(72) Inventors: Péricles Pompermayer Gumerato, Campinas (BR); Mansour Salame, Atherton, CA (US)

(73) Assignee: TALKCYCLE LLC, San Mateo, CA (US)

( * ) Notice: Subject to any disclaimer, the term of this patent is extended or adjusted under 35 U.S.C. 154(b) by 658 days.

(21) Appl. No.: 14/924,688

(22) Filed: Oct. 27, 2015

(65) Prior Publication Data
US 2017/0116206 A1   Apr. 27, 2017

(51) Int. Cl.
*G06F 16/27* (2019.01)
*H04L 29/08* (2006.01)

(52) U.S. Cl.
CPC ........ *H04L 67/1095* (2013.01); *G06F 16/273* (2019.01); *G06F 16/275* (2019.01)

(58) Field of Classification Search
CPC ................................................ G06F 17/30079
USPC ........................................................ 707/809
See application file for complete search history.

(56) References Cited

U.S. PATENT DOCUMENTS

| | | | | |
|---|---|---|---|---|
| 8,751,443 B1* | 6/2014 | McCline | ........... | G06F 17/30581 707/610 |
| 2006/0248165 A1* | 11/2006 | Sridhar | ............... | H04L 41/5003 709/218 |
| 2007/0011205 A1* | 1/2007 | Majjasie | ................ | G06Q 10/00 |
| 2012/0144407 A1* | 6/2012 | Hacigumus | ........... | G06F 9/5072 719/328 |
| 2014/0181301 A1* | 6/2014 | Yendluri | ............... | G06F 9/5072 709/225 |

* cited by examiner

*Primary Examiner* — Alford W Kindred
*Assistant Examiner* — Allen S Lin
(74) *Attorney, Agent, or Firm* — Brian R. Galvin; Galvin Patent Law LLC

(57) ABSTRACT

Real-time synchronization of data between disparate cloud data sources; local database receives data from various sources then supplies data to various destinations. A steady state database synchronization software module monitors local database for changes to data, reconciles any local change with changes to the same data in remote database, forwards reconciled data to a destination database, and monitors messages announcing that data in remote database has changed. Finally, the failsafe database synchronization software module polls the remote database periodically for changes, compares changes made to remote data and local data, outstanding changes are applied to local and remote databases as determined.

6 Claims, 14 Drawing Sheets

REAL-TIME SYNCHRONIZATION OF DATA BETWEEN DISPARATE CLOUD DATA SOURCES

BACKGROUND OF THE INVENTION

Field of the Invention

The present invention is in the field of cloud computing, and more particularly in the field of real-time synchronization of data between disparate cloud data sources such as using a database that uses primary and foreign key pairs to represent relationships between tables with a database system that uses another form of metadata to denote that relational data.

Discussion of the State of the Art

The use of computerized databases by business had its beginnings in the 1960s with the development of the SABRE system by IBM for American Airline's reservation system. At that time the database consisted of large sets of flat files that had been individually developed for a specific purpose and the application interface too was extremely complex and specifically developed to manipulate the data expected by a single project The next two decades saw significant advancement in database technology with databases progressing from a large series of files with hard coded relationships to a single file of hierarchically interconnected information or network connected information in the late 1960's to the development of the relational data model in the early 1970s and the resultant database packages such as INGRES, System R, and Oracle that arose from the relational model in the late 1970s and early 1980s. Of possibly greater importance, however, was that these relational database packages were introduced with languages such as Structured Query Language (SQL) for interacting with the database engines they contained, which greatly simplified the initial set-up of databases, retrieving information from databases and updating data when needed. These packages also came with data storage and maintenance functions pre-programmed allowing end use developers to focus solely on design of database structure rather than the minutia data storage and retrieval. While all significant steps forward, the absence of standardized application programming interface type support for database connectivity still relegated the use of databases to only large projects by large corporations as significant programming specific to the project database by a developer with highly specialized knowledge was still required. The release of such standardized application interfaces for interaction with database management systems such as open database connectivity language and java database connectivity extension which both allow applications to interface with databases largely independent of the database management system vendor in the early 1995 corresponded with the rise of the internet and internet commerce to create a large upturn in database use by small medium a large businesses. This large expansion in database use in turn drove the improvement of tools within programming languages such as C C++, Perl, Python, Ruby, and HTML, among others, further reducing the time and cost required for development of applications using databases as a part of their back ends. Currently databases are used in most aspects of business operations; sales, human resources, inventory, product support, research and development to name some examples, all have multiple commercial software packages available to serve small, medium and large business needs.

A second trend that has participated in significant increase in the availability of database driven applications to all levels of business is the rise of "cloud computing." In cloud computing, a business, instead of buying their software as a product that they then receive in whole, place on their own hardware and run locally, instead buys the software as a service, paying a monthly or yearly fee to make use of the software much like a subscription to it. In this model, the subscribing business does not have to pay for the purchase and upkeep of their own computer infrastructure, they don't need to perform their own regular back ups of the data they are generating and they do not need to be concerned about software upgrades, especially security upgrades because the could software company or "cloud service provider" performs all of those tasks on the cloud provider's infrastructure as part of the service. The great appeal to the subscribing businesses is the extremely low equipment overhead, equipment space savings, greatly reduces the size of the IT department needed and scalability, the ability to subscribe a small number of users on the system early on, and add users as growth in the business requires it, or ability to reduce users relatively quickly as needed. An example of a well established cloud service provider that has made great inroads into the field is SalesForce. SalesForce is a cloud service provider that offers a complete, generalized customer relationship management system that completely resides in the cloud. Businesses subscribe to number of seats, or users, and in return they receive the use of an instance of SalesForce's customer relationship database specific for the business' company developed by SalesForce over their 15 years of operation to have all the needed tables, field and user facing resources to encompass the needs of customer relationship management which include, general new sales lead acquisition, general sales lead tracking, generalized sales relationship handling, generalized equipment contract tracking, general customer support ticket management system, business telephony system, generalized intra business messaging. More recently, SalesForce also offers limited programming capabilities to allow the subscribing business to change somewhat the look, feel and function of the stock database and user facing interface of their SalesForce service. Some of these new programming routines allow the direct manipulation of the SalesForce database from outside of their interface. This progression is typical of the current state of cloud computing.

As one knowledgeable in the art will recognize, a serious issue which serves as an obstacle to the improvement of the usefulness of both databases and cloud service products that use them by businesses is that, once entered over time, the company's data is restricted to that database and, if present the cloud service provider the business is using preventing the business from using the data in novel or alternative ways. Since the data in question is in constant use by the business and it being up to date at all times critical to the function of the business, simply making a copy of the data for use and either then keeping two separate copies of the data or reconciling the data occasionally is not a viable remedy. What is needed is a system that can maintain the synchronization of data from a plurality of data sources in real time.

SUMMARY OF THE INVENTION

The inventor has developed a system for real-time synchronization of data from a plurality of data sources where the design of one or more of the data sources differs from that of the others.

According to a preferred embodiment of the invention, a system for real-time synchronization of data between disparate cloud data sources, comprising a local database, a database data conversion software module, an initial remote database acquisition software module, a steady state database synchronization software module and a failsafe database synchronization module. The local database: receives and stores data from a plurality of sources which includes at least one other database of heterogeneous design; and retrieves then supplies data to a plurality of destinations which includes at least one other database of heterogeneous design. The database data conversion software module: receives data records from source database; applies one or more modification steps drawn from a set comprising field name changes, table name changes, data type changes, metadata storage design changes and table assignment changes based upon parameters established for translation of data between the source database and the destination database; and outputs modified data records for incorporation into the destination database. The initial remote database acquisition software module: retrieves data from the remote database using application programming interface calls made available by the developers of that database; and tracks start and end times of the transfer to enable reconciliation of data transferred to the local database with data in the remote, source database that has changed during the transfer just prior to production use. The steady state database synchronization software module: monitors local database for changes to data, reconciles any local change with changes to the same data in remote database and forwards reconciled data to conversion software module for eventual incorporation into destination database; and monitors messages announcing that data in remote database has changed, retrieves changed data, reconciles change with changes to the same data in local database and forwards reconciled data to conversion software module for eventual incorporation into local database. Finally, the failsafe database synchronization software module: waits a predetermined amount of time, polls the remote database for list of changes made in that time period, compares changes made to remote data and changes made to local data, outstanding changes are reconciled then applied to local and remote databases as determined; and detects loss of communication between local and remote databases, tracks start time and end time of communication outage, polls the remote database for list of changes made in that time period, compares changes made to remote data and changes made to local data, outstanding changes are reconciled then applied to local and remote databases as determined.

According to another preferred embodiment of the invention, a method for a system for the real-time synchronization of data between disparate cloud data sources, the method comprising the following steps: To download entire data set from a remote database using an initial database acquisition module. To convert data from the remote database in a database data conversion module by applying one or more modification steps drawn from a set comprising field name changes, table name changes, data type changes, metadata storage design changes and table assignment changes based upon a plurality of parameters established for translation of data between the remote database and a local database. To incorporate converted data set from the remote database into the local database of disparate design. To maintain synchronization of remote and local databases under steady state conditions employing a steady state synchronization software module that uses a plurality of application programming interface functions provided by the remote database. To maintain synchronization of remote database and local database under both time recurring conditions and conditions of communication outage between the remote database and local database employing a failsafe synchronization software module that uses a plurality of application programming interface functions provided by the remote database.

BRIEF DESCRIPTION OF THE DRAWING FIGURES

The accompanying drawings illustrate several embodiments of the invention and, together with the description, serve to explain the principles of the invention according to the embodiments.

One skilled in the art will recognize that the particular embodiments illustrated in the drawings are merely exemplary, and are not intended to limit the scope of the present invention.

DETAILED DESCRIPTION

Figure 1:
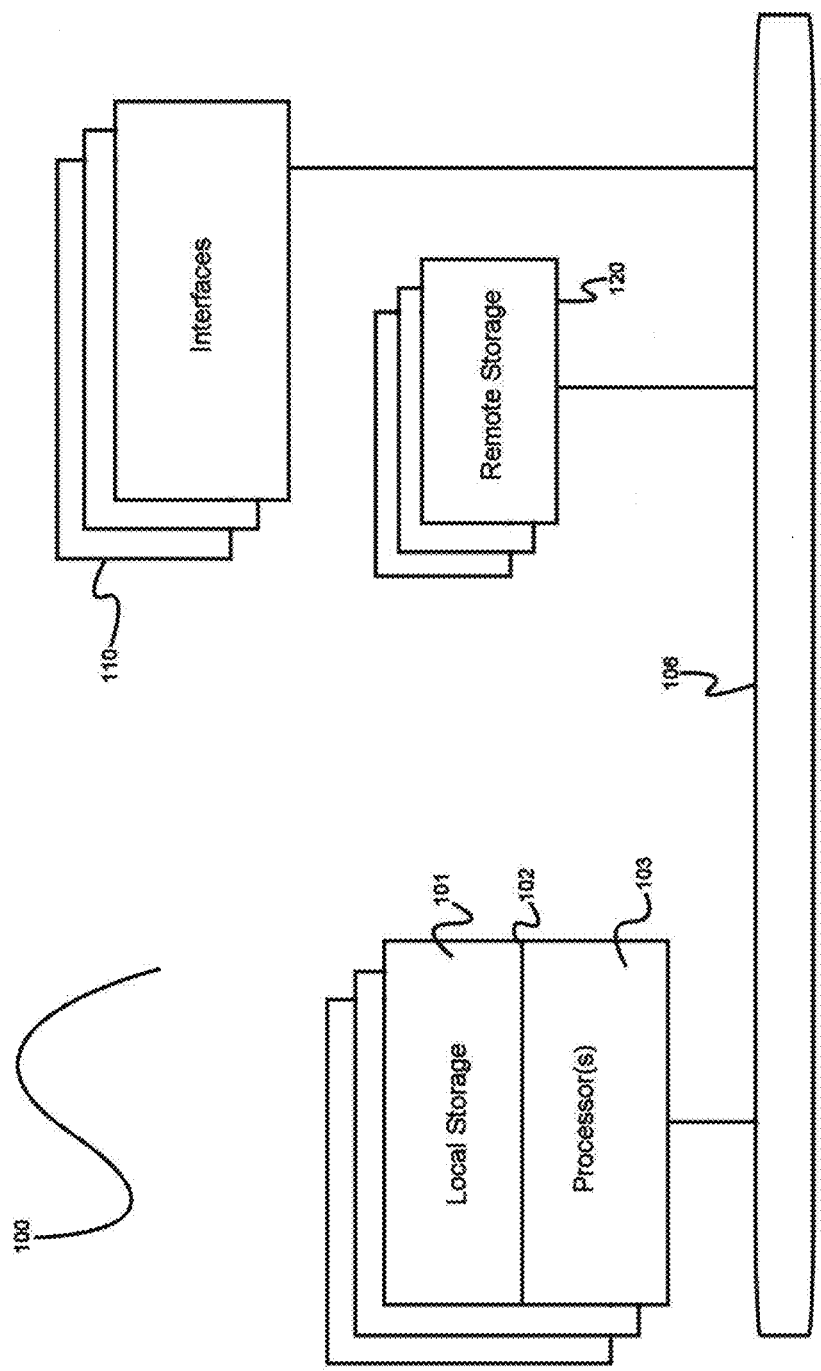
FIG. 1 is a block diagram illustrating an exemplary hardware architecture of a computing device used in various embodiments of the invention.

The inventor has conceived, and reduced to practice, various systems and methods for real-time synchronization of data between disparate cloud data sources.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "data source" is any remote system that transmits information that is structured in such a way that rules can be applied to insure the reliable and accurate storage of that information in a local database. The "data source" as used here will most often be another, remote, database, but could also be a set of text files on a file server or extensive complex spreadsheet data from within a small sized, medium sized or large sized corporation without departing from the scope of the invention as claimed.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, in a peer to peer arrangement or in a master/slave arrangement common in the art. These examples should make clear that no particular architectural approaches to database management is preferred according to the invention, and choice of data storage technology is at the discretion of each implementer, without departing from the scope of the invention as claimed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
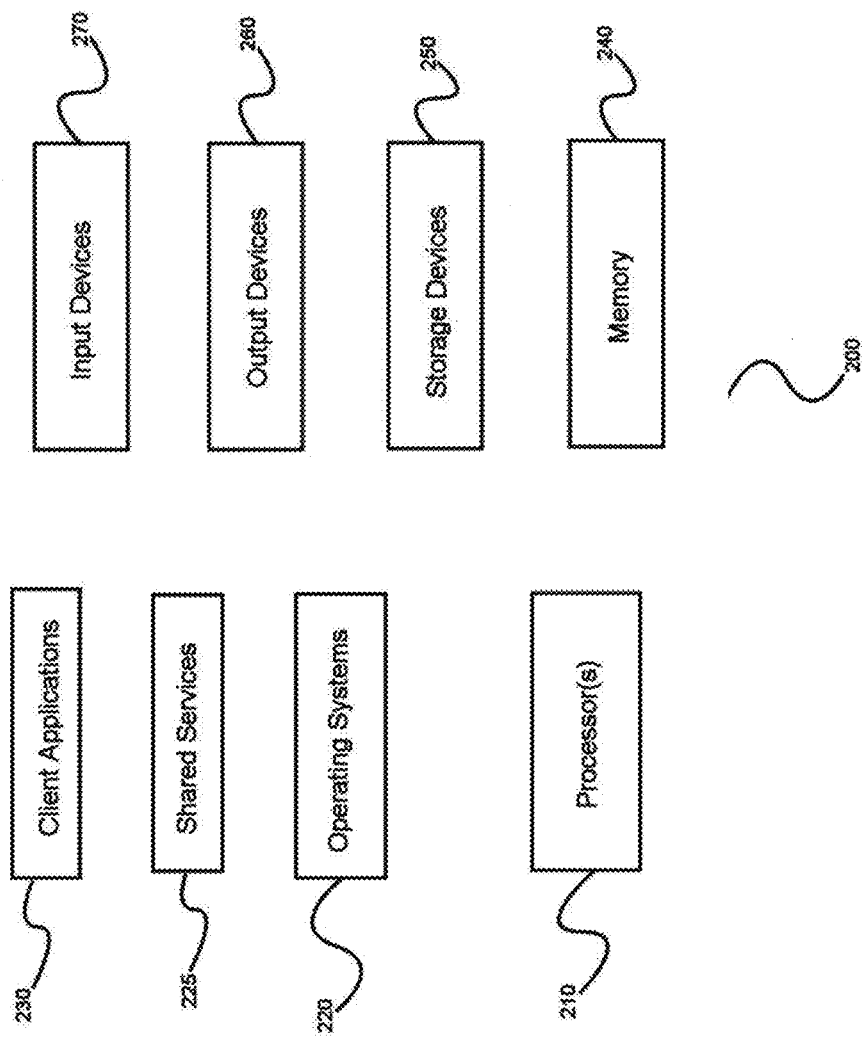
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/ or the like.

Figure 3:
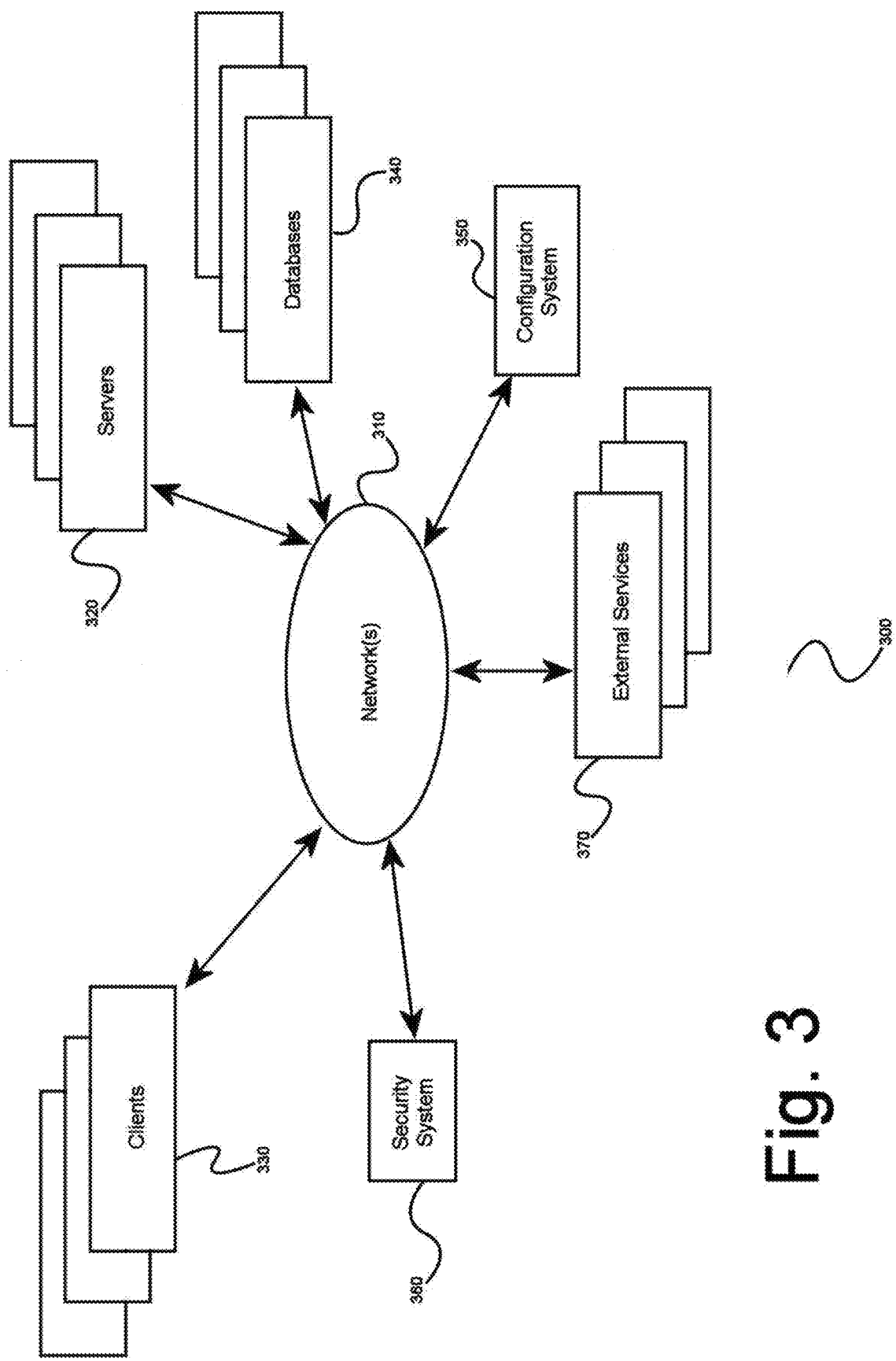
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

Figure 4:
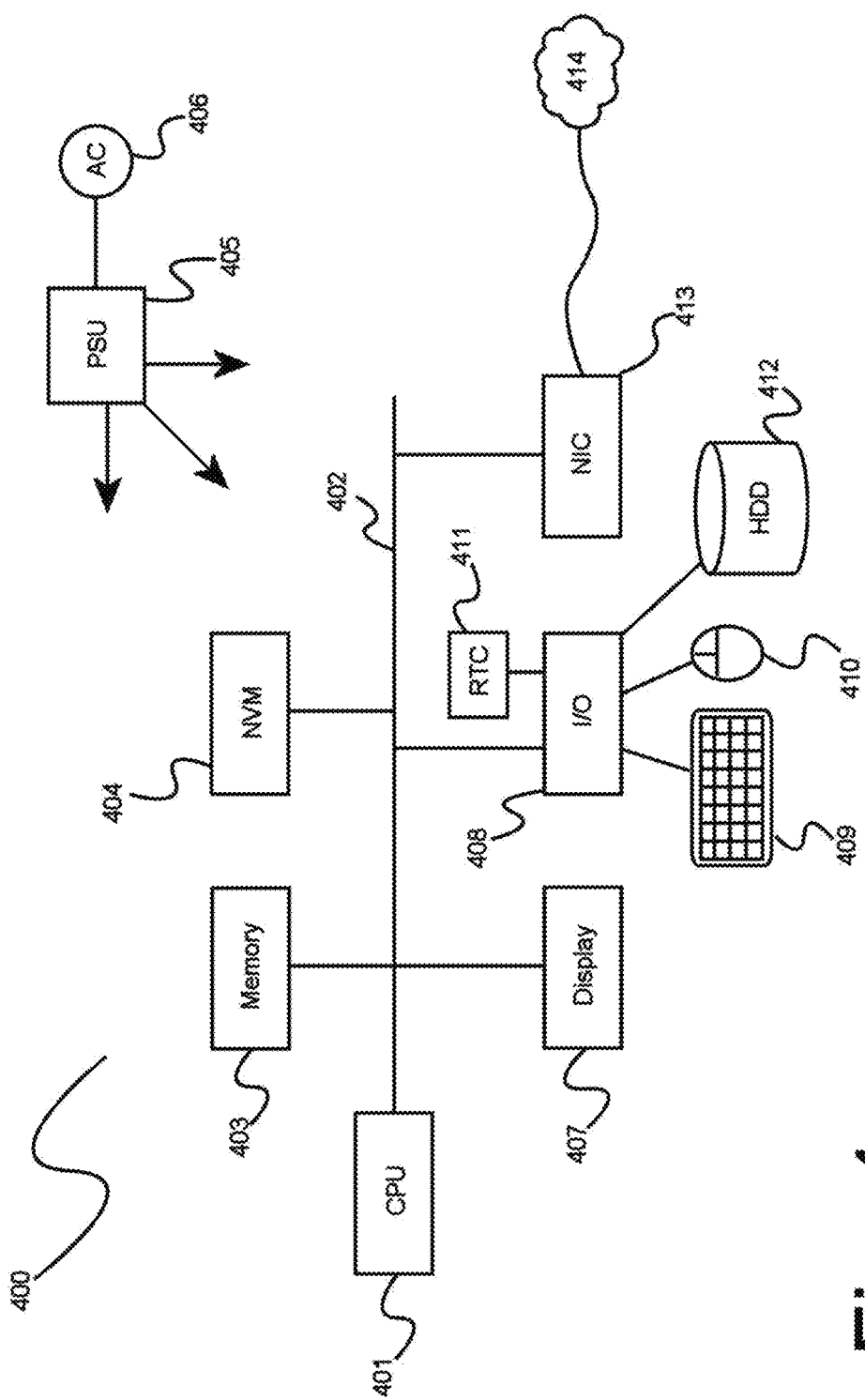
FIG. 4 is a block diagram illustrating an exemplary overview of a computer system as may be used in any of the various locations throughout the system

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
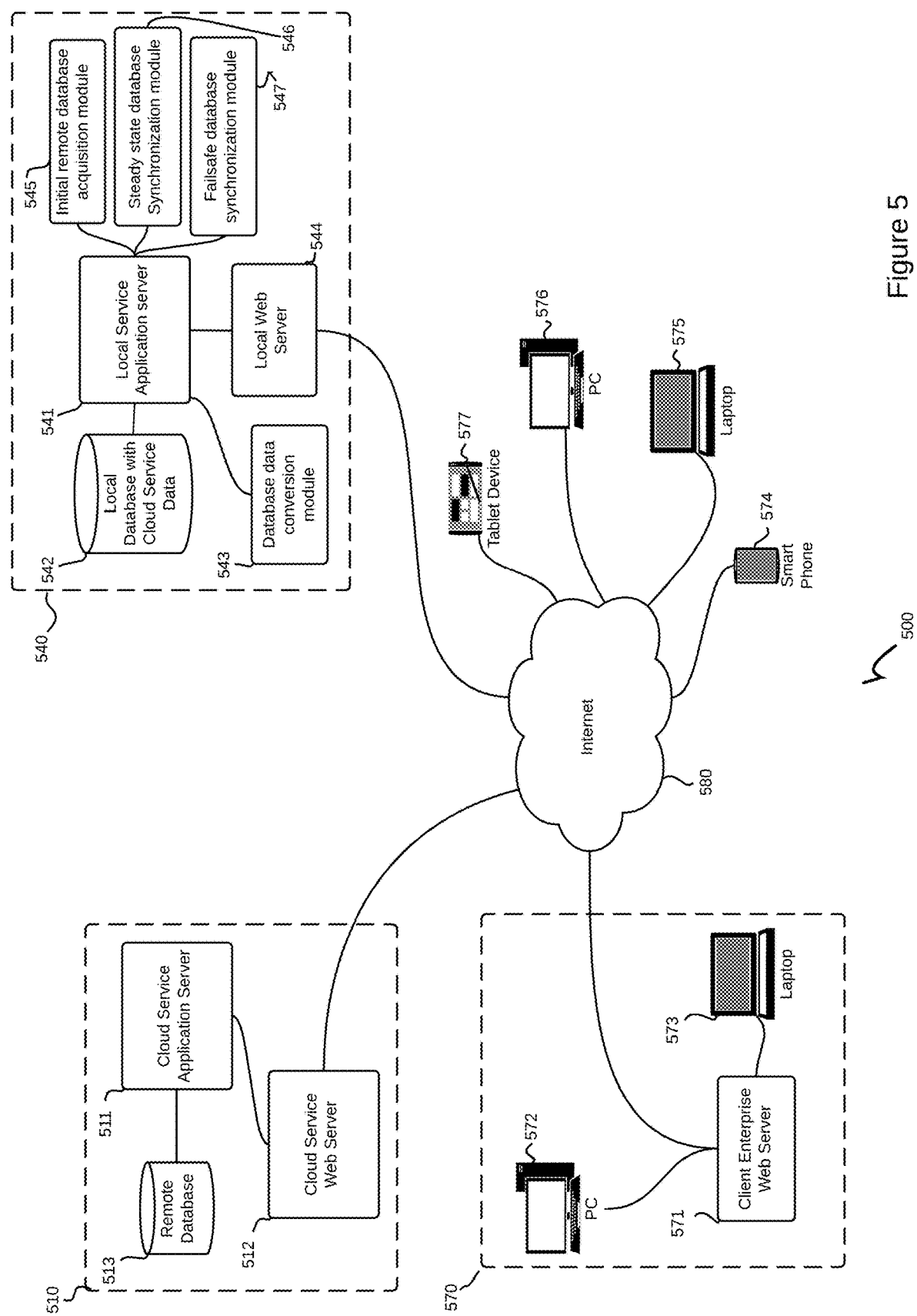
FIG. 5 is a diagram of an exemplary architecture for a system where the local database is managing data from the database of another cloud service vendor as part of the local cloud service according to an embodiment of the invention.

FIG. 5 is a block diagram of an exemplary architecture for a system 500 for real-time synchronization of data between disparate data sources. According to the embodiment, a client enterprise 570 is subscribed to a cloud service provider 510, an example of which might be SalesForce.com, which, among other things, provides data storage 513 for all of enterprise's customer relationship information. As part of the cloud service 510 subscription, the enterprise uses applications provided by the cloud service 511 linked to the database of enterprise customer information 513 within the cloud service provider's infrastructure 510 and served over the internet 580 by the cloud service provider's web servers 512 as the enterprise's repository of potential and existing customer contact information, to track sales leads, to track products and related contracts sold by them to customers, and for customer problem management. As such, the information in this database 510 is used to some extent by all employees within the enterprise 570 through the enterprise's web interface 571 whether the employees are at the enterprise's facilities employing devices that include traditional desktop computers 572 or laptop computers 573 or the employees are remote out in the field using devices such as smart phones 574, laptop computers 575, desktop computers 576 or tablet devices 577 connected using the various available gateways to the internet 580 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the customer relationship management example introduced above, the enterprise may use one cloud service provider's package to track all existing customers' previous sales, problem tickets and to receive inquiries for equipment or services sales that come in through the enterprise's customer support line but to use the software package of another cloud service provider 540 for the capture and cultivation of all new sales leads as that second package is specialized for those tasks and therefore offers many useful features for those operations. One familiar with the art will immediately realize that the function of both cloud software packages depends on the data set that they are both drawing from being functionally identical and that having both services use the same data source, for example, a single database, could serve to noticeably slow the usefulness of both packages and would rely on levels of cooperation that do not exist between the two cloud service providers 510, 540. In this embodiment of the invention, the concurrent use of the same data set by both cloud service providers 510, 540 while maintaining the integrity of the enterprise's 570 master data source 513 is accomplished by the incorporation of the enterprise's entire customer data set into database storage system 542 of the second, local cloud service provider 540. At initial set up of the local cloud provider's service, the provider's local application server 541 uses an initial master database acquisition software module 545 to request the bulk transfer of the enterprise's 570 entire customer data set 513 from the first cloud service provider 510 over the internet 580 through the local cloud service provider's web server interface 544. This initial acquisition task might use a specialized bulk download call provided by the first cloud service's application programming interface 511, if one is available. This task may also make use of REST based, SOAP based, or other, proprietary type requests provided by the first cloud service provider for smaller data downloads to transfer the entire remote data set 513 either at initial set up of the novel cloud service database, or during the course of transactions where the data needed is present in the master database but not yet present in the novel cloud service's local database, as necessary and desired. Indeed, any method of electronic data transfer from the first cloud service provider to the local cloud service provider known to those familiar to the art, could be used as the invention does not depend on any specific protocol. As the designs of two independently developed data sources are invariably heterogeneous, often related to the specific use to which they are employed, it is expected that a database conversion module 543 will be used to convert all data flowing between the local cloud service's database 542 and the first cloud service's database 513, both during the initial local database acquisition operation and during the subsequent synchronization operations required to insure data integrity of both databases 542, 513 in production use. Once in production, it would be expected that use of the local cloud service 540 applications 541 by the employees 572, 573, 574, 575, 576, 577 of the enterprise will introduce a plurality of changes to the local cloud provider's 540 representation of the enterprise's data 542 while continued use of the first cloud provider's 510 applications 511 by the enterprise's employees 572, 573, 574, 575, 576, 577 will lead to non-matching changes to the first cloud provider's representation of the enterprise's data 513. A system of robust synchronization software has been developed to insure that both the remote database 513 and the local database 542 have the same data in real time. The steady state database synchronization software module 546 monitors for and uses messages issued by other cloud service providers 510 that announce changes to their database 513, to incorporate those changes into the local database 542. If those messages include the data record that has changed, that is used by the database data conversion software module 543 in the local database integration process. Otherwise, if the changed data is not included with the change message sent by the other cloud service provider 510, the steady state database synchronization software module 546, upon receiving the message, will request the changed data from the source 510 and upon receipt, that data will be converted 543 and incorporated into the local database 542. While the steady state database synchronization software module 546 is used by the invention to process change messages from other cloud service providers 510 and incorporate the data into the local database is present, this should not be interpreted to mean that the invention is dependent on the other cloud service providing such messages, the invention can use other means to obtain changes made to the remote database 513 and is not dependent on messages being sent. Conversely, changes made to the local database 542 during production use are converted to the design of the remote cloud provider's data source 513 and then incorporated into the other cloud service provider's 510 database 513 by application programming interface call. In rapidly changing stateless communications like those just outlined, information can be lost as messages are not delivered, due to packets being dropped 580, server workload 511, 512, 513, 541, 542, 543, 544 or complete outages of either communication hardware or server hardware. It is the function of the failsafe database synchronization software module 547 to insure that both databases are current. The failsafe database synchronization module 547 possesses routines for both the timed confirmation of database synchronization and recovery of synchronization after functional communication failure of unforeseen period. The timed confirmation routine repetitively waits a predetermined interval of time, for example 30 minutes, and then polls both databases 513, 542 for all changes made during that period. Changes supplied by both databases are then compared and corresponding, incorporated changes are removed. Remaining changes to either the remote database 513 or local database 542 are then reconciled in case of multiple changes to the same records and the net changes incorporated as determined. In the case of communication loss between the two databases, the failsafe database synchronization software module 547 records the start time of the outage and then the time that functional communications are restored. As with the recurring timed process, changes made to either the remote database 513 or the local database 542 are compared to remove any changes that have been resolved and the remaining changes reconciled at the record and field level to insure the incorporated data reflects the most current status as determined by the process.

Figure 6:
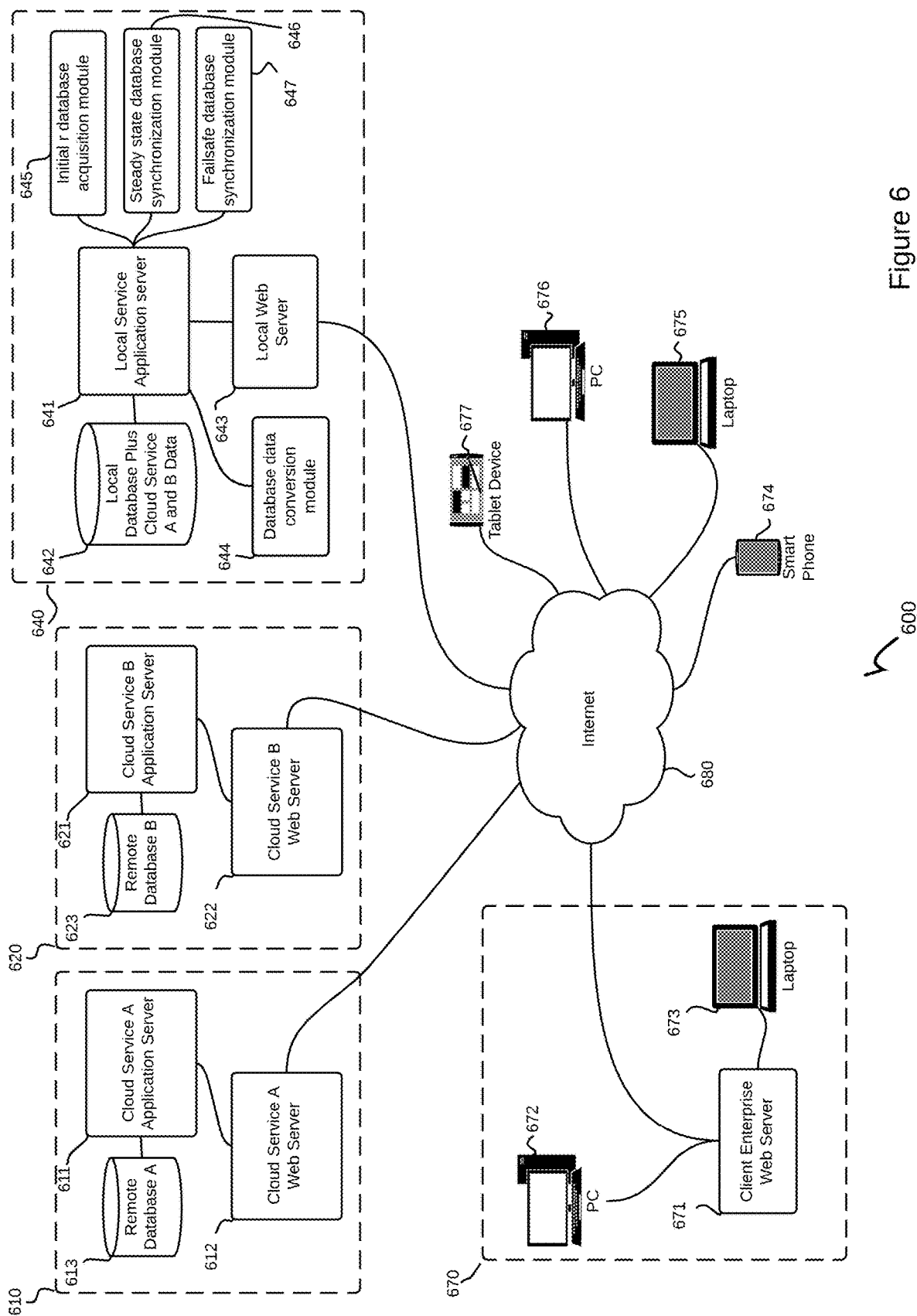
FIG. 6 is a diagram of an exemplary architecture for a system where the local database is managing data from the databases of a plurality of cloud service vendors as part of the local cloud service according to an embodiment of the invention.

FIG. 6 is a block diagram of a preferred architecture for a system 600 for real-time synchronization of data between disparate data sources. According to the embodiment, a client enterprise 670 is subscribed to a plurality of cloud service providers 610, 620 which, among other things, provide data storage for all of enterprise's customer relationship information for their heavy equipment division 613 and their hazardous material response equipment division 623. As part of the cloud service 610 subscription, the enterprise's heavy equipment division uses applications provided by the cloud service 611 linked to the database of heavy equipment division's customer information 613 within the cloud service provider's infrastructure 610 and served over the internet 680 by the cloud service provider's web servers 612 as the heavy equipment division's repository of potential and existing customer contact information, to track sales leads, to track products and related contracts sold by them to customers, and for customer problem management. As such, the information in this database 610 is used to some extent by all employees within the heavy equipment division within the enterprise 670 through the enterprise's web interface 671 whether the those employees are at the enterprise's facilities employing devices that include traditional desktop computers 672 or laptop computers 673 or those employees are remote out in the field using devices such as smart phones 674, laptop computers 675, desktop computers 676 or tablet devices 677 connected using the various available gateways to the internet 680 known to the art and the database is subject to continuous data changes which are vital to the function of the enterprise.

Likewise, as part of the cloud service subscription with cloud service provider B 620, the enterprise's hazardous materials response division uses applications provided by second cloud service 621 linked to remote database B of hazardous materials response division's customer information 623 within the second cloud service provider's infrastructure 620 and served over the internet 680 by the cloud service provider's web servers 622 as the hazardous materials response division's repository of potential and existing customer contact information, to track sales leads, to track products and related contracts sold by them to customers, and for customer problem management. As such, the information in this database 620 is used to some extent by all employees within the hazardous materials response division within the enterprise 670 through the enterprise's web interface 671 whether the those employees are at the enterprise's facilities employing devices that include traditional desktop computers 672 or laptop computers 673 or those employees are remote out in the field using devices such as smart phones 674, laptop computers 675, desktop computers 676 or tablet devices 677 connected using the various available gateways to the internet 680 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the customer relationship management example introduced above, one division of the enterprise may use one cloud service provider's package to track all existing customers' previous sales, problem tickets and to receive inquiries for equipment or services sales that come in through the enterprise's customer support line 610 while a second division uses another cloud service provider for the same purposes 620 for a plurality of reasons. It may then become highly advantageous for the entire enterprise to use the software package of a third cloud service provider 640 for example, the capture and cultivation of all new sales leads as that third package is specialized for those tasks and therefore offers many useful features for those operations. One familiar with the art will immediately realize that the function of the three cloud software packages depends on the entire data set that the third cloud provider draws fully from and the other cloud providers draw partially from being functionally identical and that individual portions derived from the provider A 610 and provider B 620 in the local database 642 mirror the remote data sources 610, 620 exactly. In the embodiment, the concurrent use of the same data set by three cloud service providers 610, 620, 640 while maintaining the integrity of the enterprise's 670 remote data sources 613, 623 is accomplished by the incorporation of both portions of the enterprise's entire customer data set into database storage system 642 of the local cloud service provider 640. At initial set up of the local cloud provider's service, the provider's local application server 641 uses an initial remote database acquisition software module 645 to request the bulk transfer of the enterprise's 670 entire customer data set 613, 623 from cloud service provider A 610 and cloud service provider B 620 over the internet 680 through the local cloud service provider's web server interface 644. This initial acquisition task might use a specialized bulk download call provided by the cloud services' application programming interfaces 611, 621, if one is available. This task also make use of REST, SOAP, stream-based, or other similar API/protocol requests provided by the other cloud service providers for smaller data downloads to transfer the entire remote data set 613, 623 if necessary. Indeed, any method of electronic data transfer from the first cloud service provider to the local cloud service provider known to those familiar to the art, could be used as the invention does not depend on any specific protocol. As the designs of two independently developed data sources are invariably heterogeneous, often related to the specific use to which they are employed, it is expected that a database conversion module 643 will be used to convert all data flowing between the local cloud service's database 642 and the other cloud services' databases 613, 623 both during the initial local database acquisition operation and during the subsequent synchronization operations required to insure data integrity of all three databases 642, 613, 623 in production use. Once in production, it would be expected that use of the local cloud service 640 applications 641 by the employees 672, 673, 674, 675, 676, 677 of the enterprise will introduce a plurality of changes to the local cloud provider's 640 representation of the enterprise's data 642 while continued use of the other two cloud providers' 610, 620 applications 611, 621 by the enterprise's employees 672, 673, 674, 675, 676, 677 will lead to non-matching changes to the first two cloud providers' partial representations of the enterprise's data 613, 623. A system of robust synchronization software has been developed as part of the invention to insure that both the remote databases 613, 623 and the local database 642 have the same data in real time. The steady state database synchronization software module 646 monitors for and uses messages issued by other cloud service providers' 610, 620 that announce changes to their databases 613, 623 to incorporate those changes into the local database 642. If those messages include the data record that has changed, that is used by the database data conversion software module 643 in the local database integration process. Otherwise, if the changed data is not included with the change message sent by the other cloud service providers 610, 620 the steady state database synchronization software module 646, upon receiving the message, will request the changed data from the sources 610, 620 and upon receipt, that data will be converted 643 and incorporated into the local database 642. While the steady state database synchronization software module 646 is used by the invention to process change messages from other cloud service providers 610, 620 and incorporate the data into the local database is present, this should not be interpreted to mean that the invention is dependent on the other cloud service providing such messages, the invention can use other means to obtain changes made to the remote databases 613, 623 and is not dependent on messages being sent. Conversely, changes made to the local database 642 during production use are converted to the design of the remote cloud providers' data sources 613 and then incorporated into the other cloud service provider's 610, 620 database 613, 623 by application programming interface call. In rapidly changing stateless communications like those just outlined, information can be lost as messages are not delivered, due to packets being dropped 680, server workload 611, 612, 613, 621, 622, 623, 641, 642, 643, 644 or complete outages of either communication hardware or server hardware. It is the function of the failsafe database synchronization software module 647 to insure that both databases are current. The failsafe database synchronization module 647 possesses routines for both the timed confirmation of database synchronization and recovery of synchronization after functional communication failure of unforeseen period. The timed confirmation routine repetitively waits a predetermined interval of time, for example 30 minutes, and then polls all three databases 613, 623, 642 for all changes made during that period. Changes supplied by the databases are then compared and corresponding, incorporated changes are removed. Remaining changes to either remote database 613, 623 or local database 642 are then reconciled in case of multiple changes to the same records and the net changes incorporated as determined. In the case of communication loss between the any two or all three databases, the failsafe database synchronization software module 647 records the start time of the outage and then the time that functional communications are restored. As with the recurring timed process, changes made to either remote database 613, 623 or the local database 642 are compared to remove any changes that have been resolved and the remaining changes reconciled at the record and field level to insure the incorporated data reflects the most current status as determined by the process.

Figure 7:
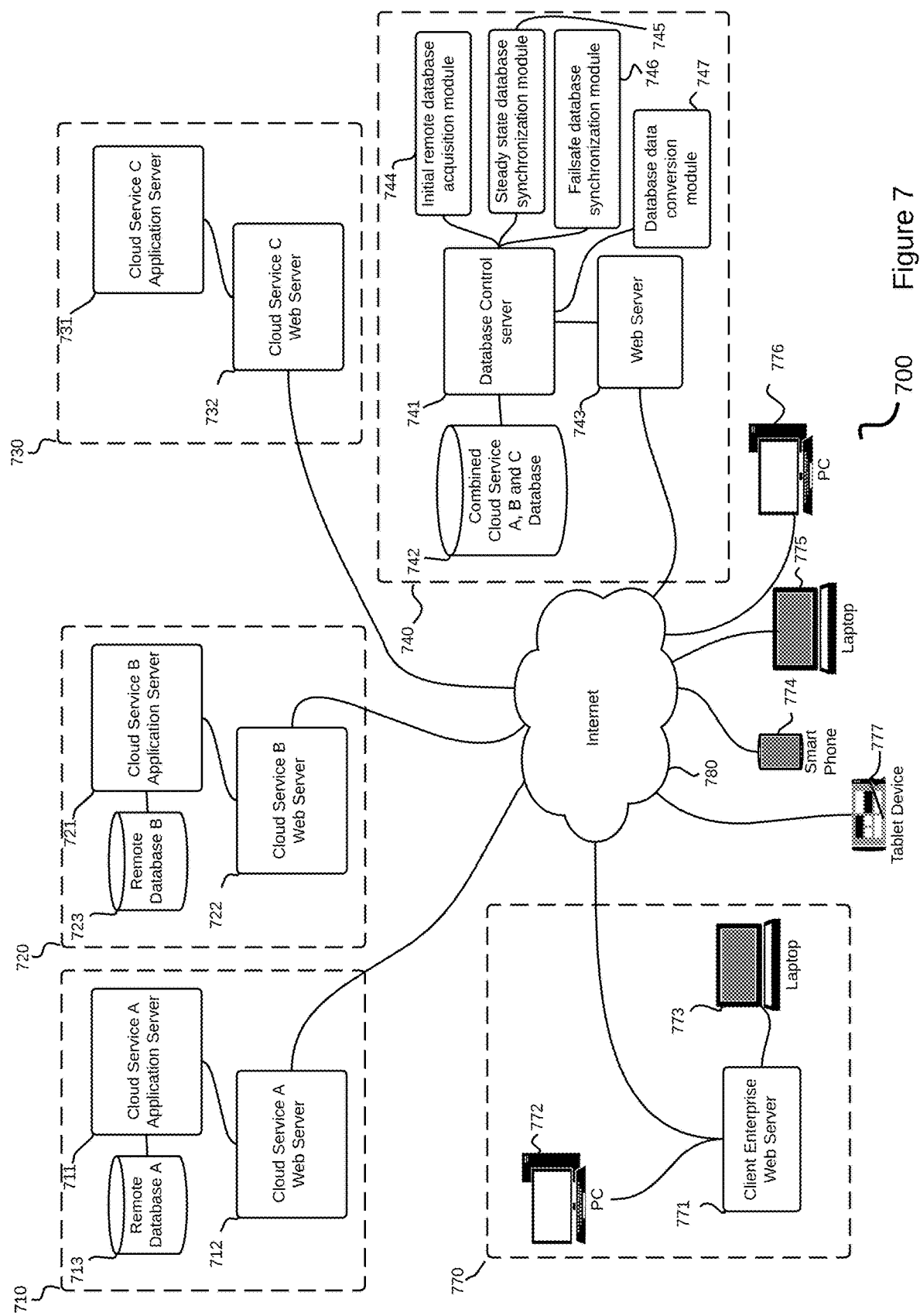
FIG. 7 is a diagram of an exemplary architecture for a system where the local database is one of a plurality of cloud service based databases managed within a centralized database which might host the data employed by a plurality of additional cloud based services according to an embodiment of the invention.

FIG. 7 is a block diagram of another preferred architecture for a system 700 for real-time synchronization of data between disparate data sources. According to the embodiment, a client enterprise 770 is subscribed to a plurality of cloud service providers 710, 720 which, among other things, provide data storage for all of enterprise's package shipment tracking information for their heavy freight division 713 and their rapid delivery division 723. As part of the cloud service 710 subscription, the enterprise's heavy freight division uses applications provided by cloud service A 711 linked to the database of heavy freight division's container information 713 within the cloud service provider's infrastructure 710 and served over the internet 780 by the cloud service provider's web servers 712 as the heavy freight division's repository of shipper and recipient contact information, to track scheduled pickups, to track shipments and related shipper paperwork, and for shipment problem management. As such, the information in this database 710 is used to some extent by all employees within the heavy freight division within the enterprise 770 through the enterprise's web interface 771 whether the those employees are at the enterprise's facilities employing devices that include traditional desktop computers 772 or laptop computers 773 or those employees are remote out in the field using devices such as smart phones 774, laptop computers 775, desktop computers 776 or tablet devices 777 connected using the various available gateways to the internet 780 known to the art and the database is subject to continuous data changes which are vital to the function of the enterprise.

Likewise, as part of the cloud service subscription with cloud service provider B 720, the enterprise's rapid delivery division uses applications provided by second cloud service 721 linked to remote database B of rapid shipment division's shipping information 723 within the second cloud service provider's infrastructure 720 and served over the internet 780 by the cloud service provider's web servers 722 as the rapid shipment division's repository of shipper and recipient contact information, to track scheduled pickups, to track shipments and related shipper paperwork, and for shipment problem management. As such, the information in this database 720 is used to some extent by all employees within the hazardous materials response division within the enterprise 770 through the enterprise's web interface 771 whether the those employees are at the enterprise's facilities employing devices that include traditional desktop computers 772 or laptop computers 773 or those employees are remote out in the field using devices such as smart phones 774, laptop computers 775, desktop computers 776 or tablet devices 777 connected using the various available gateways to the internet 780 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the shipping information example introduced above, one division of the enterprise may use one cloud service provider's package to track all existing shippers and recipients, shipments, problem tickets and to receive new pickup requests that come in through the enterprise's customer support line 710 while a second division uses another cloud service provider for the same purposes 720 for a plurality of reasons. It may then become highly advantageous for the entire enterprise to use the software package of a third cloud service provider 730 for example, to capture and store pictorial data which the two original databases were ill equipped to handle and provide select public facing data on all packages as part of an emergency response initiative. Instead of having closed, local, data storage hardware, this third cloud service provider, C, uses their standalone database service to which they act as a client 740 and which may or may not also serve the same data to other cloud service providers that the enterprise 770 uses. One familiar with the art will immediately realize that the function of the three cloud software packages depends on the entire data set, which the third cloud provider draws fully from and the other cloud providers draw partially from being functionally identical and that individual portions derived from the provider A 710 and provider B 720 in cloud service C's standalone database system 742 mirror the remote data sources 710, 720 exactly. In the embodiment, the concurrent use of the same data set by three cloud service providers 710, 720 while maintaining the integrity of the enterprise's 770 remote data sources 713, 723 is accomplished by the incorporation of both portions of the enterprise's entire customer data set into standalone database storage system 742 of the cloud service provider C 740. At initial set up of the local cloud provider's service, the standalone data storage system's database controller 741 uses an initial master database acquisition software module 744 to request the bulk transfer of the enterprise's 770 entire customer data set 713, 723 from cloud service provider A 710 and cloud service provider B 720 over the internet 780 through the standalone data storage system's web server interface 743. This initial acquisition task might use a specialized bulk download call provided by the cloud services' application programming interfaces 711, 721, if one is available. This task also make use of REST based, SOAP based, or streaming API-based (or any other appropriate protocol known in the art) requests provided by the cloud service providers A or B for smaller data downloads to transfer the entire remote data set 713, 723 if necessary. Indeed, any method of electronic data transfer from the first cloud service provider to the standalone data storage system known to those familiar to the art, could be used as the invention does not depend on any specific protocol. As the designs of three independently developed data sources are invariably heterogeneous, often related to the specific use to which they are employed, it is expected that a database conversion module 747 will be used to convert all data flowing between the standalone data storage system's database 742 and the other cloud services' databases 713, 723 both during the initial local database acquisition operation and during the subsequent synchronization operations required to insure data integrity of all three databases 742, 713, 723 in production use. Once in production, it would be expected that use of the standalone data storage system 740 by applications of cloud storage provider C 731 by the employees 772, 773, 774, 775, 776, 777 of the enterprise will introduce a plurality of changes to cloud service provider C's 740 representation of the enterprise's data 742 while continued use of the other two cloud providers' 710, 720 applications 711, 721 by the enterprise's employees 772, 773, 774, 775, 776, 777 will lead to non-matching changes to the first two cloud providers' partial representations of the enterprise's data set 713, 723. A system of robust synchronization software has been developed as part of the invention to insure that both the remote databases 713, 723 and the standalone database 742 have the same data in real time. The steady state database synchronization software module 745 monitors for and uses messages issued by other cloud service providers' 710, 720 that announce changes to their databases 713, 723 to incorporate those changes into the standalone database 742. If those messages include the data record that has changed, that record is used by the database data conversion software module 747 in the standalone data storage system's integration process. Otherwise, if the changed data is not included with the change message sent by the other cloud service providers 710, 720 the steady state database synchronization software module 745, upon receiving the message, will request the changed data from the sources 710, 720 and upon receipt, that data will be converted 747 and incorporated into the standalone database 742. While the steady state database synchronization software module 745 is used by the invention to process change messages from other cloud service providers 710, 720 and incorporate the data into the local database is present, this should not be interpreted to mean that the invention is dependent on the other cloud service providing such messages, the invention can use other means to obtain changes made to the remote databases 713, 723 and is not dependent on messages being sent. Conversely, changes made to the standalone database 742 during production use are converted to the design of the remote cloud providers' data sources 713, 723 and then incorporated into the other cloud service provider's 710, 720 database 713, 723 by application programming interface call. In rapidly changing stateless communications like those just outlined, information can be lost as messages are not delivered, due to packets being dropped 780, server workload 711, 712, 713, 721, 722, 723, 741, 742, 743, or complete outages of either communication hardware or server hardware. It is the function of the failsafe database synchronization software module 746 to insure that all databases are current. The failsafe database synchronization module 746 possesses routines for both the timed confirmation of database synchronization and recovery of synchronization after functional communication failure of unforeseen period. The timed confirmation routine repetitively waits a predetermined interval of time, for example 30 minutes, and then polls all databases 713, 723, 742 for all changes made during that period. Changes supplied by the databases are then compared and corresponding, incorporated changes are removed. Remaining changes to either remote databases 713, 723 or standalone database 742 are then reconciled in case of multiple changes to the same records and the net changes incorporated as determined. In the case of communication loss between the any two or all three databases, the failsafe database synchronization software module 746 records the start time of the outage and then the time that functional communications are restored. As with the recurring timed process, changes made to either remote database 713, 723 or the standalone system database 742 are compared to remove any changes that have been resolved and the remaining changes reconciled at the record and field level to insure the incorporated data reflects the most current status as determined by the process.

Figure 8:
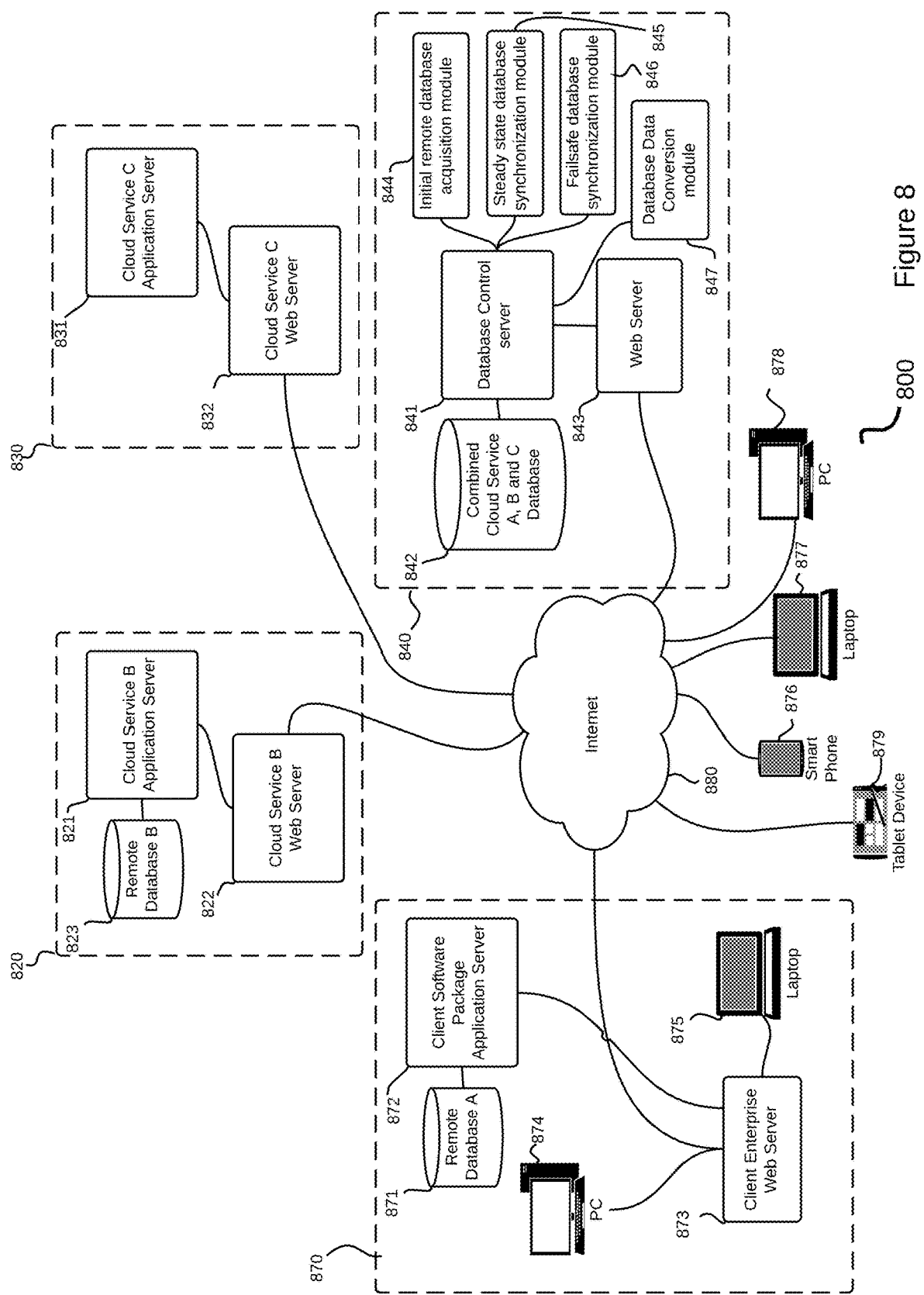
FIG. 8 is a diagram of an exemplary architecture for a system where the local database and client software package database are two of a plurality of databases managed within a centralized database which might host the data employed by a plurality of additional cloud based services according to an embodiment of the invention.

FIG. 8 is a block diagram of another preferred architecture for a system 800 for real-time synchronization of data between disparate data sources. According to the embodiment, a client enterprise 870 is subscribed to a cloud service provider 820 which, among other things, provides data storage for all of enterprise's package shipment tracking information for their heavy freight division 813. The enterprise's rapid delivery division uses an in-house system 872 and attached database 871 to provide the same information. As part of the cloud service 820 subscription, the enterprise's heavy freight division uses applications provided by cloud service A 821 linked to the database of heavy freight division's container information 823 within the cloud service provider's infrastructure 820 and served over the internet 880 by the cloud service provider's web servers 822 as the heavy freight division's repository of shipper and recipient contact information, to track scheduled pickups, to track shipments and related shipper paperwork, and for shipment problem management. As such, the information in this database 820 is used to some extent by all employees within the heavy freight division within the enterprise 870 through the enterprise's web interface 873 whether the those employees are at the enterprise's facilities employing devices that include traditional desktop computers 874 or laptop computers 875 or those employees are remote out in the field using devices such as smart phones 876, laptop computers 877, desktop computers 878 or tablet devices 879 connected using the various available gateways to the internet 880 known to the art and the database is subject to continuous data changes which are vital to the function of the enterprise.

Similarly, as part of the in-house shipment tracking application 872, the enterprise's rapid delivery division uses data stored in the attached remote database A as their repository of shipper and recipient contact information, to track scheduled pickups, to track shipments and related shipper paperwork, and for shipment problem management. As such, the information in this database 871 is used to some extent by all employees within the hazardous materials response division within the enterprise 870 through the enterprise's network whether the those employees are at the enterprise's facilities employing devices that include traditional desktop computers 874 or laptop computers 875 or those employees are remote out in the field using devices such as smart phones 876, laptop computers 877, desktop computers 878 or tablet devices 879 connected using the various available gateways to the internet 880 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the shipping information example introduced above, one division of the enterprise may use one cloud service provider's package to track all existing shippers and recipients, shipments, problem tickets and to receive new pickup requests that come in through the enterprise's customer support line 820 while a second division uses internal software for the same purposes 872, 873 for a plurality of reasons. It may then become highly advantageous for the entire enterprise to use the software package of a third cloud service provider 830 for example, to capture and store pictorial data which the two original databases are ill equipped to handle and provide select public facing data on all packages as part of an emergency response initiative. Instead of having closed, local, data storage hardware, this third cloud service provider, C, uses their standalone database service to which they act as a client 840 and which may or may not also serve the same data to other cloud service providers that the enterprise 870 uses. One familiar with the art will immediately realize that the function of the three cloud software packages depends on the entire data set, which the third cloud provider draws fully from and the other cloud providers draw partially from, being functionally identical and that individual portions derived from the provider A 820 and the internal database 871 in cloud service C's standalone database system 842 mirror the remote data sources 820, 871 exactly. In the embodiment, the concurrent use of the same data set by three data storage systems 820, 871, 840 while maintaining the integrity of the enterprise's 870 remote data sources 871, 823 is accomplished by the incorporation of both portions of the enterprise's entire customer data set into standalone database storage system 842 of the cloud service provider C 840. At initial set up of the local cloud provider's service, the standalone data storage system's database controller 841 uses an initial remote database acquisition software module 844 to request the bulk transfer of the enterprise's 870 entire customer data set 871, 823 from cloud service provider A 820 and the internal data storage system 871 over the internet 880 through the standalone data storage system's web server interface 843. This initial acquisition task might use a specialized bulk download call provided by the cloud service's application programming interface 821, and the application programming interface of the internal software 872, if one is available. This task also make use of REST based, SOAP based or streaming based requests provided by the cloud service provider A or the internal software package 872 for smaller data downloads to transfer the entire remote data set 872, 823 if necessary. Indeed, any method of electronic data transfer from the first cloud service provider to the standalone data storage system known to those familiar to the art, could be used as the invention does not depend on any specific protocol. As the designs of three independently developed data sources are invariably heterogeneous, often related to the specific use to which they are employed, it is expected that a database conversion module 847 will be used to convert all data flowing between the standalone data storage system's database 842 and the databases 872, 823 both during the initial local database acquisition operation and during the subsequent synchronization operations required to insure data integrity of all three databases 842, 872, 823 in production use. Once in production, it would be expected that use of the standalone data storage system 840 by applications of cloud storage provider C 831 by the employees 874, 875, 876, 877, 878, 879 of the enterprise will introduce a plurality of changes to cloud service provider C's 840 representation of the enterprise's data 842 while continued use of the other two 871, 820 applications 871, 821 by the enterprise's employees 874, 875, 876, 877, 878, 879 will lead to non-matching changes to the two other databases' partial representations of the enterprise's data set 871, 823. A system of robust synchronization software has been developed as part of the invention to insure that all remote databases 871, 823 and the standalone database 842 have the same data in real time. The steady state database synchronization software module 845 monitors for and uses messages issued by other software packages 872, 821 that announce changes to their databases 871, 823 to incorporate those changes into the standalone database 842. If those messages include the data record that has changed, that record is used by the database data conversion software module 847 in the standalone data storage system's integration process. Otherwise, if the changed data is not included with the change message sent by the other software packages 872, 820 the steady state database synchronization software module 845, upon receiving the message, will request the changed data from the sources 870, 820 and upon receipt, that data will be converted 847 and incorporated into the standalone database 842. While the steady state database synchronization software module 845 is used by the invention to process change messages from other software packages providers 870, 820 and incorporate the data into the local database is present, this should not be interpreted to mean that the invention is dependent on the other cloud service providing such messages, the invention can use other means to obtain changes made to the remote databases 871, 823 and is not dependent on messages being sent. Conversely, changes made to the standalone database 842 during production use are converted to the design of the remote data sources 871, 823 and then incorporated into the other databases 871, 823 by application programming interface calls. In rapidly changing stateless communications like those just outlined, information can be lost as messages are not delivered, due to packets being dropped 880, server workload 871, 872, 873, 821, 822, 823, 841, 842, 843, or complete outages of either communication hardware or server hardware. It is the function of the failsafe database synchronization software module 846 to insure that all databases are current. The failsafe database synchronization module 846 possesses routines for both the timed confirmation of database synchronization and recovery of synchronization after functional communication failure of unforeseen period. The timed confirmation routine repetitively waits a predetermined interval of time, for example 30 minutes, and then polls all databases 871, 823, 842 for all changes made during that period. Changes supplied by the databases are then compared and corresponding, incorporated changes are removed. Remaining changes to either remote databases 871, 823 or standalone database 842 are then reconciled in case of multiple changes to the same records and the net changes incorporated as determined. In the case of communication loss between the any two or all three databases, the failsafe database synchronization software module 846 records the start time of the outage and then the time that functional communications are restored. As with the recurring timed process, changes made to either remote database 871, 823 or the standalone system database 842 are compared to remove any changes that have been resolved and the remaining changes reconciled at the record and field level to insure the incorporated data reflects the most current status as determined by the process.

Those skilled in the art will realize that, although aspects of customer relationship management have been used above as an example of one area where the invention could be used, the invention is in no way limited in usefulness to this exemplary area. The examples could equally well have been inventory and occupancy of rooms on ships in a cruise ship line or to manage facets of airline reservations and operations.

Figure 14:
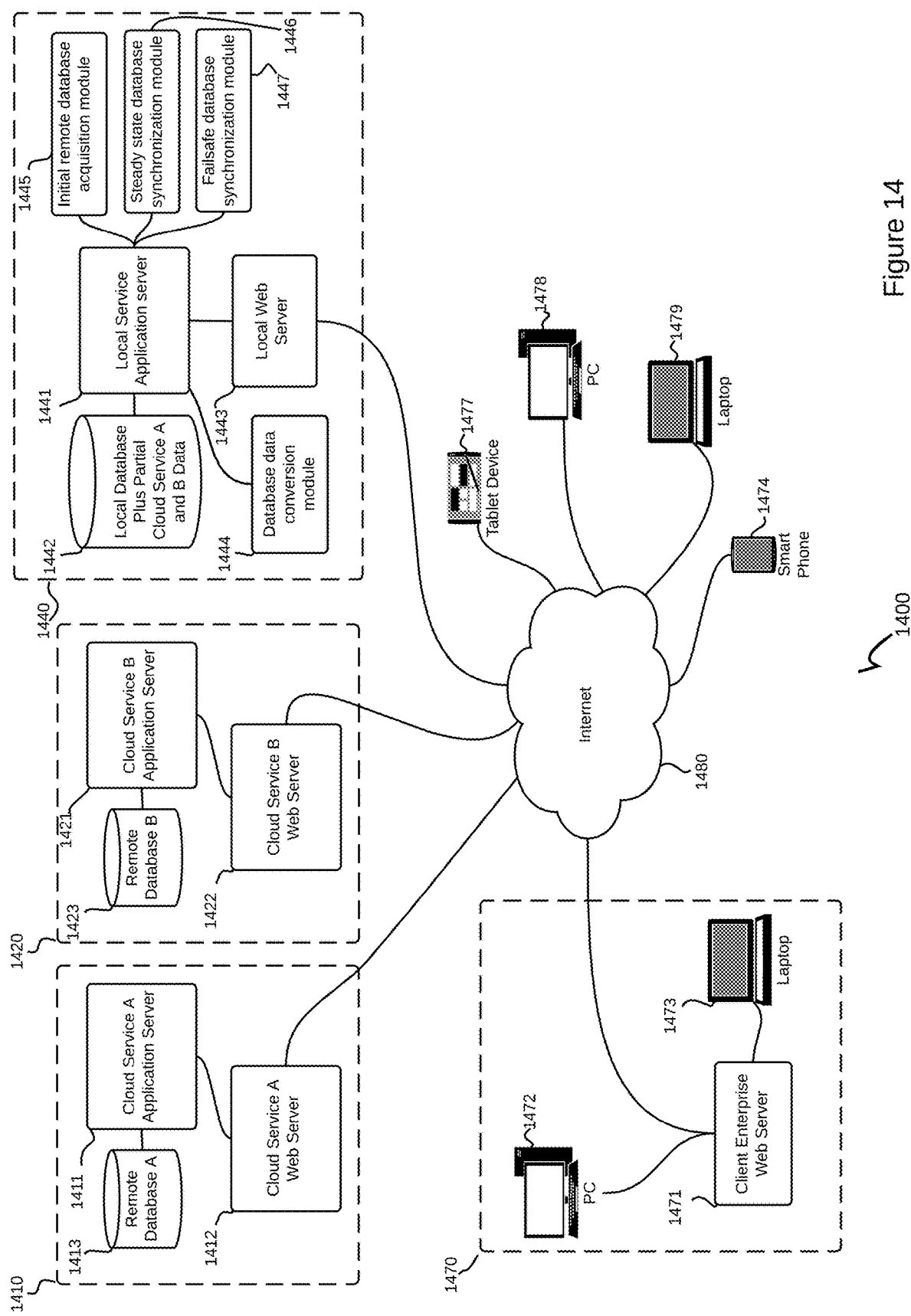
FIG. 14 is a diagram of an exemplary architecture for a system where the local cloud service replies to a query that requires information not present in the local database by issuing derived queries to the databases of a plurality of cloud service vendors as part of the local cloud service according to an embodiment of the invention.

FIG. 14 is a block diagram of another preferred architecture for a system 1400 for real-time synchronization of data between disparate data sources. According to the embodiment, a client enterprise 1470 is subscribed to multiple cloud service providers 1410, 1420, 1440 each with its own database 1413, 1423, 1442 each of which maintains the information needed to carry out the functions the cloud services provide. Those knowledgeable in the art will agree that these individual cloud service databases are likely to possess some amount of data in common and a plurality of data that is unique to one of the databases alone. It can be easily imagined that over time in business needs will arise for retrieving existing data using novel methods or parameters that were not preplanned and for which a single database schema does not exist. As an extremely simple illustrative example, the database 1413 of cloud service A 1410 may have, as part of the data tracked, the names and addresses of all customers and prospects for a subscribing business 1470. The database 1423 of cloud service B 1420 may, as part of the data tracked, have the names of all customers as well as all of the purchases and the promotional purchase discount each of the customers have made from the subscribing business 1470. The marketing department, which uses cloud service provider C 1440 and its database 1442, an embodiment of the invention, develops a sales campaign where customers who purchase products from the business 1470 at or above a certain dollar amount which varies by the state in which the company resides. This information is not available from a single cloud service provider's database, it requires the ability of the invention issue derivative queries to cloud service provider A 1410 to get the address of each customer based on name and the purchases each customer has made from the database of cloud service provider B 1420. Taking this one step further using the invention's 1440 ability to update the data in remote databases 1413, 1423, the marketing department could change the promotional purchase discount of each company based upon their total purchases made in the past three months compared to the other customers in the same state. This task would, of course, involve not only the ability of the invention to perform inter-database joins on the databases of cloud service A 1413 and cloud service B 1423, but also the ability to then accept changes made to some of that data and to perform updates on the data of the foreign databases 1413, 1423. I should be remembered that the above examples are extremely oversimplified, easily manipulated examples used solely to explain certain capabilities of the invention, not as a reflection of the level of ability of the invention. Indeed, it is fully expected that actual manipulations performed by the invention will be significantly more complex than those discussed here and it is those complex manipulations for which the invention is designed.

Description of Method Embodiments

Figure 9:
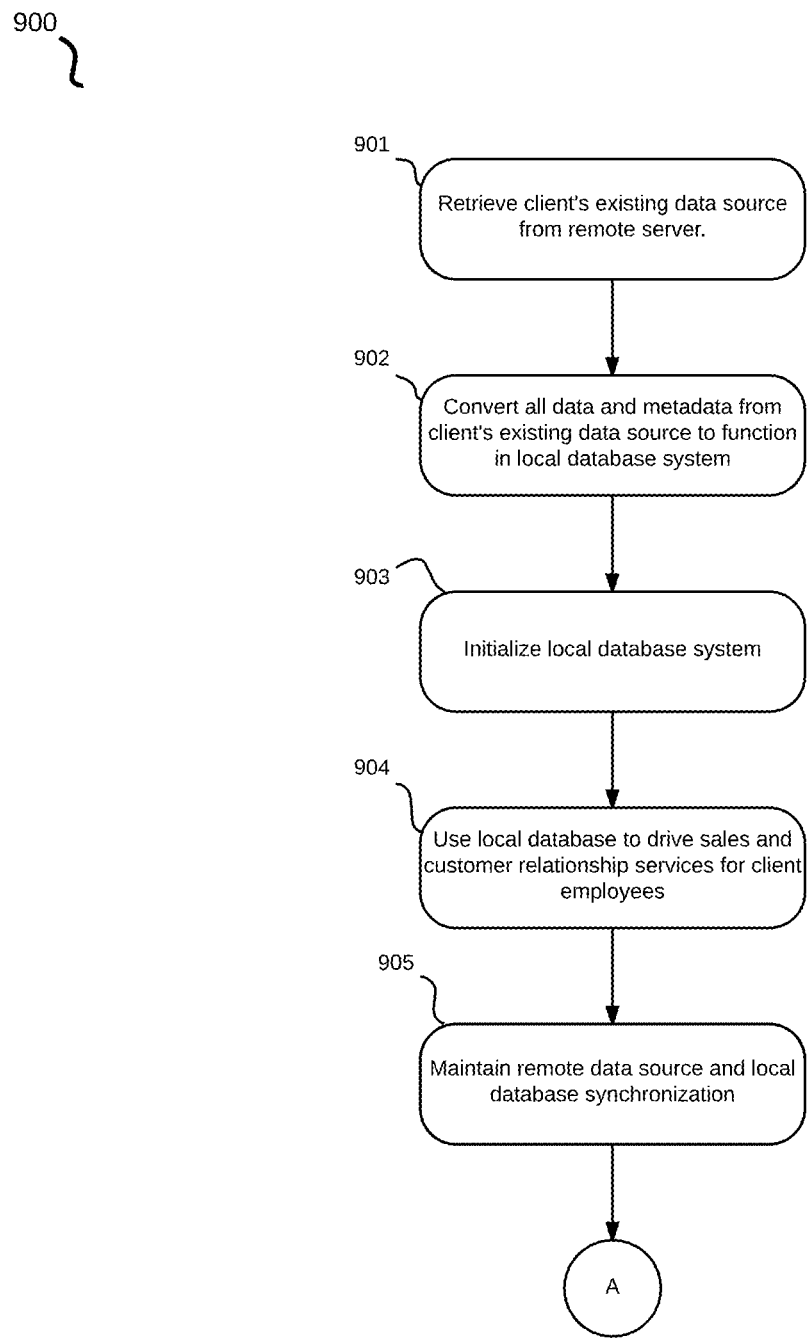
FIG. 9 is a process flow diagram of a method for download, conversion, and maintenance of a remote database by a local database using a system of the invention.

FIG. 9 is a process flow diagram of a method 900 for the download of the data set from a client enterprise's cloud service based master data source 510 to the second cloud service's local database 542. Ideally, this initial download 901, which has the potential to be very large in terms of data can be done using a bulk data transfer call provided by the remote master data source's application programming interface (API) found on their application server 511 as such a provision would result in the largest possible quantity of data transferred per request and the fastest possible transfer. In the absence of a specialized, bulk protocol, other API calls, based on common internet protocols such as REST or SOAP, possibly available for the download of smaller portions of the data source could be used to retrieve the entire data set over time. It should be clear that while this step of the local database initialization method relies on some means to download the data in the remote data source, the invention does not rely on any specific protocol or process and any protocol that allows the secure transfer of data over the internet could be used for this purpose, indeed data from the remote data source can be incorporated into the local as the data is used during production transactions if circumstances require such a method. Virtually all independent data repositories or sources differ in the design and manner in which the data is structured and represented due to data administrator's preference as well as the specific use to which the data is to be put. In order to incorporate the initial data from the remote data source 510 into the local database 903, one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. Once data conversion and initialization of the local database have completed 903, a final reconciliation of the data may be done by the failsafe database synchronization software module 547 (not specifically depicted in the diagram 900) prior to placing the applications of the local cloud service provider 540 into production 904. Once in production, it is crucial that the data in the local database and the remote data source remained synchronized in real-time 905. This is accomplished using methods for steady state synchronization 1000, 1100, and failsafe synchronization 1200, 1300 which together insure the integrity of the data in both locations 513, 542.

Figure 10:
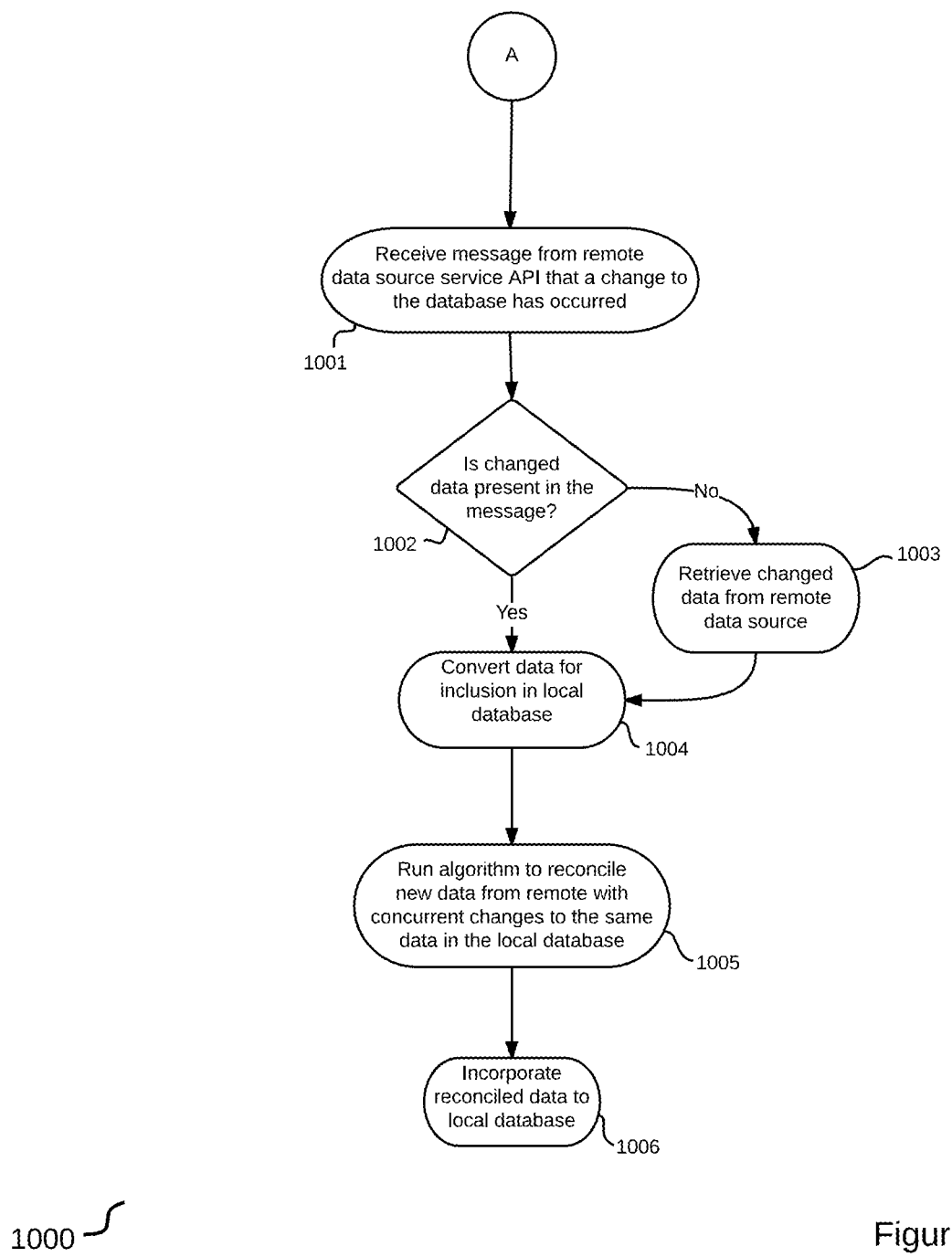
FIG. 10 is a process flow diagram of a method for steady state maintenance of synchronization between remote database and local database using a system of the invention.

FIG. 10 is a process flow diagram of a method 1000 for one embodiment of steady state data synchronization between the remote data source 510 and the local database 543. A change occurring to the data stored at the remote data source generates a message from the application server 511 at the remote data source to the local cloud service provider 541, 1001. This message may either contain a record with the data that has changed or may not contain that data 1002. If the data is not included in the message, the local application server 541 requests and retrieves that changed data 1003 from the remote data source 510. Those data from the remote data source may then undergo one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made concurrently within the target database, a type of race condition, algorithm's must be used to look at the precise time potentially conflicting modifications were incorporated, what data changed, what fields were affected, and the specific changes made to the fields that underwent update 1005 and possible alterations made to some of the data to reflect the resolved, net changes prior to committing that data record to the target database. This reconciliation process may result in the record being retransmitted back to the remote data source as described in 1100.

Figure 11:
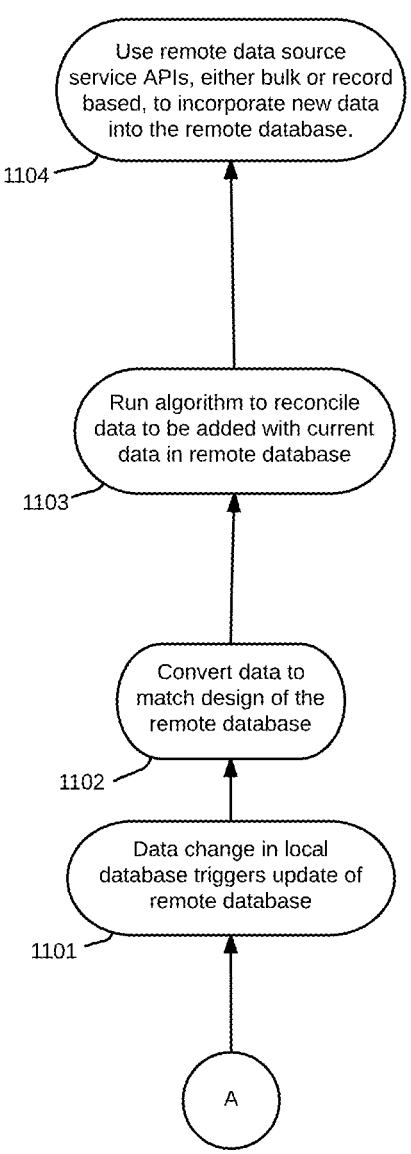
FIG. 11 is a process flow diagram of a method for steady state maintenance of synchronization between local database and remote database using a system of the invention.

FIG. 11 is a process flow diagram of a method 1100 for one embodiment of steady state data synchronization between the local database 543 and the remote data source 510. According to this embodiment, change occurring to the data stored in the local database 542, 1101 generates a message within the application server of the local cloud service provider 541 either due to a monitor algorithm resident in the application server or a trigger invoked in the database 543. This change message results in the changed record, or records as changes may be aggregated to minimize upload traffic and counts, being queued for transmittal to the remote data source 510. Those data from the local database may then undergo one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made concurrently within the target database, a type of race condition, algorithm's must be used to look at the precise time potentially conflicting modifications were incorporated, what data changed, what fields were affected, and the specific changes made to the fields that underwent update 1103 and possible alterations made to some of the data to reflect the resolved, net changes prior to committing that data record to the remote data source using API calls supplied by the remote data source application server 1104. The reconciliation process may result in the record being retransmitted back to the local database as described in 1000.

Figure 12:
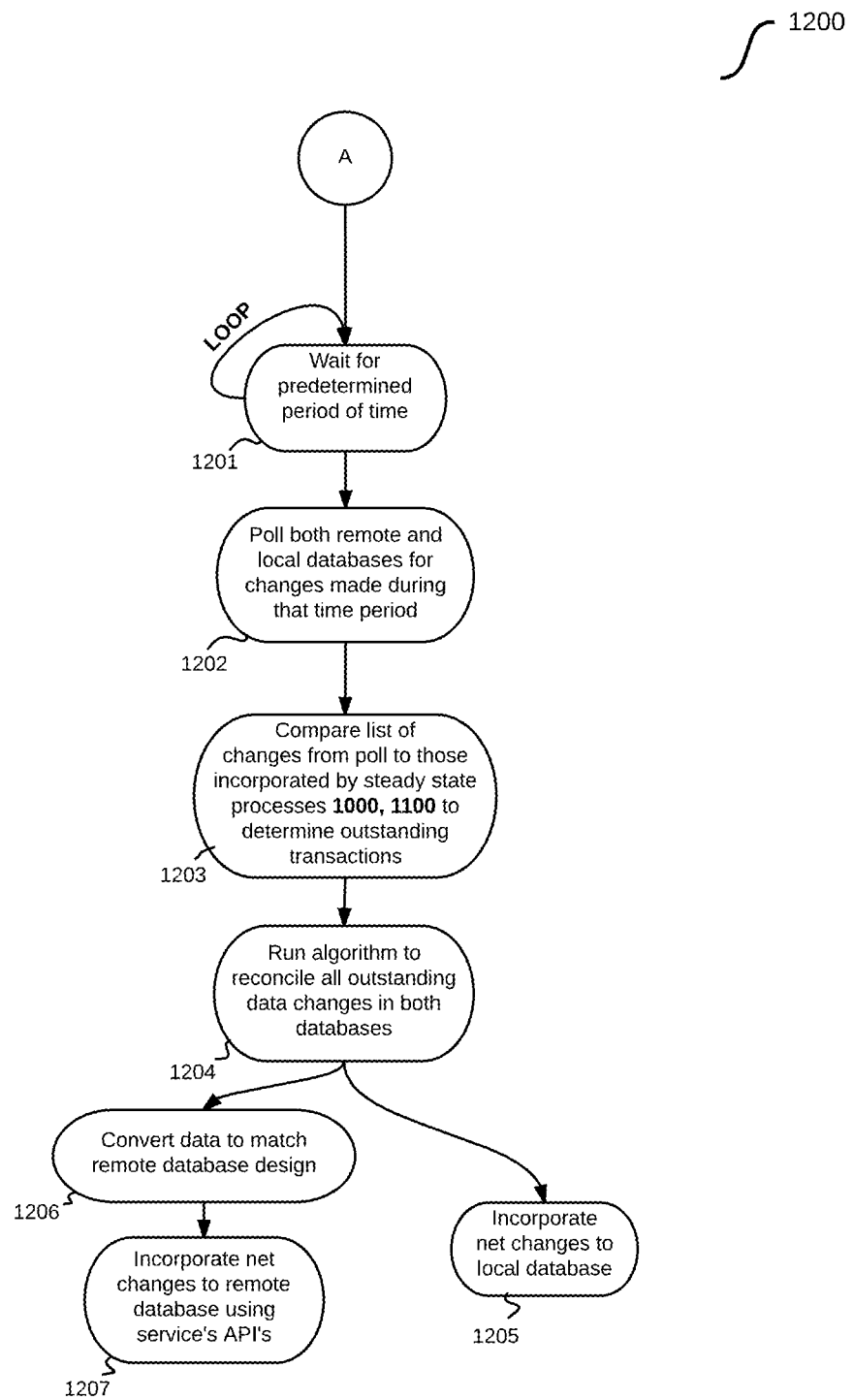
FIG. 12 is a process flow diagram of a method for timed failsafe maintenance of synchronization between remote database and local database using a system of the invention.

FIG. 12 is a process flow diagram of a method 1200 for one of the operations of the failsafe database synchronization software modules. To prevent the loss of synchronicity between the databases due to missed stateless messages and other undetected communication failures between the remote data source and the local database. This algorithm repetitively waits a predetermined period of time 1201 at which point it polls both the remote data source 510 and the local database 543 for all changes that have occurred during the prescribed time interval 1202. The reported changes from each the remote data source and the local database are compared 1203 and only changes that have not present in both are then acted upon. Outstanding changes are then subjected to one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made within one of the databases, algorithm's must be used to look at the precise time potentially conflicting modifications were incorporated, what data changed, what fields were affected, and the specific changes made to the fields that underwent update 1204. Net data changes are then incorporated into the local database 542, 1205, or converted to match the design parameters of the remote data source 1206 and incorporated into the remote data source 510 using one of the remote data source's API calls 1207.

Figure 13:
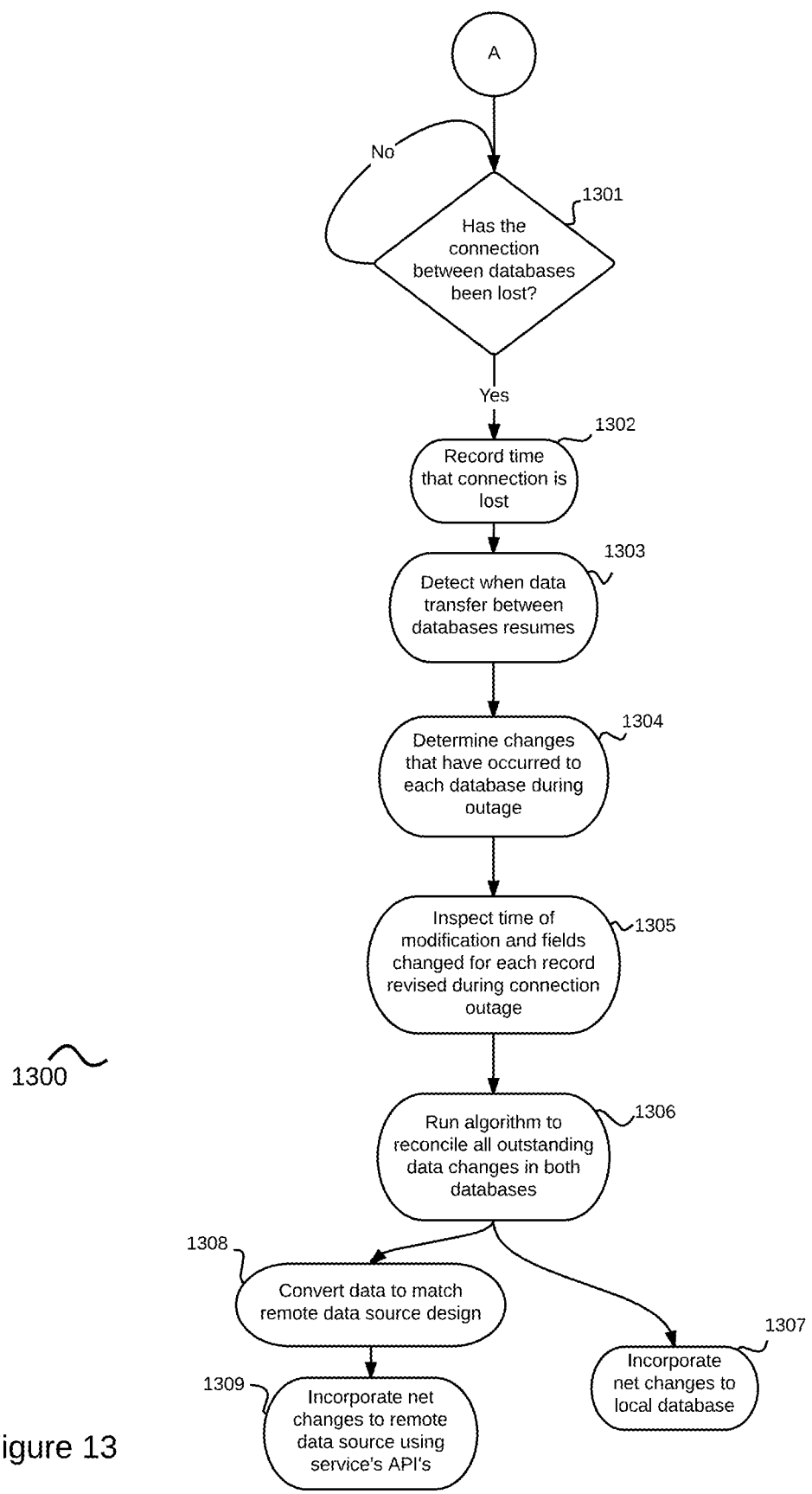
FIG. 13 is a process flow diagram of a method for failsafe maintenance of synchronization between remote database and local database after a communications outage using a system of the invention.

FIG. 13 is a process flow diagram of a method 1300 for recovery synchronization of remote data source 510 and local database 542 after a communications failure between the two of unforeseen amount of time. An algorithm part of failsafe database synchronization software module 547 monitors for a loss in functional communication between the remote data source and the local database 1301. Upon determination that communication has been lost, the time of loss is recorded by the algorithm 1302. When functional communication is detected as restored 1303, the failsafe algorithm polls both the remote data source 510 and the local database 543 for all changes that have occurred during the time interval of the outage 1304. The reported changes from each the remote data source and the local database 1305 are compared and only changes that have not present in both are then acted upon. Outstanding changes are then subjected to one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made within one of the databases, algorithm's must be used to look at the precise time potentially conflicting modifications were incorporated, what data changed, what fields were affected, and the specific changes made to the fields that underwent update 1306. Net data changes are then incorporated into the local database 542, 1307, or converted to match the design parameters of the remote data source 1208 and incorporated into the remote data source 510 using one of the remote data source's API calls 1209.

The skilled person will be aware of a range of possible modifications of the various embodiments described above. Accordingly, the present invention is defined by the claims and their equivalents.

What is claimed is:

1. A system for real-time synchronization of data between disparate cloud data sources, comprising:
   a first cloud-based database comprising at least a processor, a memory, and a plurality of programming instructions stored in the memory and operating on the processor, wherein the programming instructions, when operating on the processor, cause the processor to:
   (a) receive and store data from a plurality of sources, wherein the plurality of sources comprises at least a second cloud-based database of a different design from that of the first cloud-based database;
   (b) retrieve and supply data to a plurality of destinations, wherein at least one of the plurality of destinations is the second cloud-based database;
   a database data conversion module comprising at least a processor, a memory, and a plurality of programming instructions stored in the memory and operating on the processor, wherein the programming instructions, when operating on the processor, cause the processor to:
   (c) receive data records from a data source, wherein the data source comprises either the first cloud-based database or the second cloud-based database;
   (d) apply one or more modification steps drawn from a set comprising field name changes, table name changes, data type changes, metadata storage design changes, and table assignment changes based upon parameters established for translation of data between the data source and a data destination, wherein the data destination comprises either the first cloud-based database or the second cloud-based database;
   (e) output modified data records for incorporation into the data destination;
   an initial master database acquisition module comprising at least a processor, a memory, and a plurality of programming instructions stored in the memory and operating on the processor, wherein the programming instructions, when operating on the processor, cause the processor to:
   (f) retrieve data from a master database as a file transfer, the file transfer using application programming interface calls made available by the developers of the master database;
   (g) track start and end times of the file transfer to enable reconciliation of data transferred to the first cloud-based database with data in the second cloud-based database prior to production use;
   a steady state database synchronization module comprising at least a processor, a memory, and a plurality of programming instructions stored in the memory and operating on the processor, wherein the programming instructions, when operating on the processor, cause the processor to:
   (h) monitor the first cloud-based database for any changes, reconcile any changes with changes to the same data in the second cloud-based database and forward reconciled data to conversion software module for eventual incorporation into second database;

(i) monitor the second cloud-based database for changes to data, reconcile any changes with changes to the same data in the first cloud-based database and forward reconciled data to the database data conversion module for incorporation into the first cloud-based database; and a failsafe database synchronization module comprising at least a processor, a memory, and a plurality of programming instructions stored in the memory and operating on the processor, wherein the programming instructions, when operating on the processor, cause the processor to:

(j) wait a predetermined amount of time, poll the second cloud-based database for a list of changes made during the predetermined amount of time, compare changes made to data in the second cloud-based database and changes made to data in the first database, reconcile changes and apply them to both the first and second cloud-based databases as determined; and (k) detect loss of communication between the first and second cloud-based databases, track an outage period comprising the start time and end time of the loss of communication, poll the second cloud-based database for a list of changes made during the outage period, compare changes made to data in the second cloud-based database and changes made to data in the first cloud-based database, reconcile changes and apply them to both the first and second cloud-based databases as determined;

wherein robust, real-time data synchronization is provided by using the combination of the steady state database synchronization module and the failsafe database synchronization module to keep data synchronized in real-time between, and to ensure data integrity between, both the first cloud-based database and the plurality of destinations including the second cloud-based database.

2. The system of claim 1, wherein the first cloud-based database does not contain the entire data set of the second cloud-based database based upon the needs of applications using the first database, and the initial master database acquisition software module, database data conversion software module, steady state database synchronization software module, and failsafe database synchronization software module will acquire, convert and maintain synchronization of only the data subset comprising the first cloud-based database.

3. The system of claim 1, wherein the first cloud-based database is be comprised of data from more than one data source such that the first cloud-based database represents a superset of any one data source.

4. The system of claim 3, wherein the initial master database acquisition software module, database data conversion software module, steady state database synchronization software module, and failsafe database synchronization software module will acquire, convert and maintain synchronization of the data in the first cloud-based database and each constituent data source.

5. The system of claim 1, whereas the first cloud-based database act as a standalone data resource to a plurality of cloud computing service solutions in a server-client relationship.

6. A method for allowing the real-time synchronization of data between disparate cloud data sources, the method comprising the following steps:

(a) receiving and storing data from a plurality of sources, wherein the plurality of sources comprises at least a second cloud-based database of a different design from that of a first cloud-based database;

(b) retrieving and supplying data to a plurality of destinations, wherein at least one of the plurality of destinations is the second cloud-based database;

(c) receiving data records from a data source, wherein the data source comprises either the first cloud-based database or the second cloud-based database;

(d) applying one or more modification steps drawn from a set comprising field name changes, table name changes, data type changes, metadata storage design changes and table assignment changes based upon parameters established for translation of data between the data source and a data destination, wherein the data destination comprises either the first cloud-based database or the second cloud-based database;

(e) outputting modified data records for incorporation into the data destination;

(f) retrieving data from a master database as a file transfer, the file transfer using application programming interface calls made available by developers of the master database;

(g) tracking start and end times of the file transfer to enable reconciliation of data transferred to the first cloud-based database with data in the second cloud-based database prior to production use;

(h) monitoring the first cloud-based database for any changes, reconciling any changes with changes to the same data in the second cloud-based database and forwarding reconciled data for eventual incorporation into the second cloud-based database;

(i) monitoring the second cloud-based database for changes to data, reconciling any changes with changes to the same data in the first cloud-based database and forwarding reconciled data to the database data conversion-module for incorporation into the first cloud-based database;

(j) waiting a predetermined amount of time, polling the second cloud-based database for a list of changes made during the predetermined amount of time, comparing changes made to data in the second cloud-based database and changes made to data in the first database, reconciling changes and applying them to both the first and second cloud-based databases as determined; and (k) detecting loss of communication between the first and second cloud-based databases, tracking an outage period comprising the start time and end time of the loss of communication, polling the second cloud-based database for a list of changes made during the outage period, comparing changes made to data in the second cloud-based database and changes made to data in the first cloud-based database, reconciling changes and applying them to both the first and second cloud-based databases as determined;

wherein robust, real-time data synchronization is provided to keep data synchronized in real-time between, and to ensure data integrity between, both the first cloud-based database and the plurality of destinations including the second cloud-based database.

* * * * *